(12) United States Patent
Tang

(10) Patent No.: US 12,535,336 B2
(45) Date of Patent: Jan. 27, 2026

(54) METHOD, APPARATUS, AND COMPUTER PROGRAM PRODUCT FOR MAP GEOMETRY GENERATION BASED ON DATA AGGREGATION AND CONFLATION

(71) Applicant: HERE GLOBAL B.V., Eindhoven (NL)

(72) Inventor: Fei Tang, Aarau (CH)

(73) Assignee: HERE GLOBAL B.V., Eindhoven (NL)

( * ) Notice: Subject to any disclaimer, the term of this patent is extended or adjusted under 35 U.S.C. 154(b) by 65 days.

(21) Appl. No.: 17/662,144

(22) Filed: May 5, 2022

(65) Prior Publication Data
US 2023/0358563 A1 Nov. 9, 2023

(51) Int. Cl.
*G01C 21/00* (2006.01)
*G06F 16/29* (2019.01)
(Continued)

(52) U.S. Cl.
CPC ..... *G01C 21/3859* (2020.08); *G01C 21/3804* (2020.08); *G01C 21/3841* (2020.08);
(Continued)

(58) Field of Classification Search
CPC ............ G01C 21/3859; G01C 21/3804; G01C 21/3841; G01C 21/3848; G01C 21/3852;
(Continued)

(56) References Cited

U.S. PATENT DOCUMENTS

| 8,949,021 B2 | 2/2015 | Witmer |
| 9,171,485 B2 | 10/2015 | Gautama et al. |

(Continued)

FOREIGN PATENT DOCUMENTS

| CN | 101924647 A | 12/2010 |
| CN | 107743431 A | 2/2018 |

(Continued)

OTHER PUBLICATIONS

Agmon et al, "An algorithm for finding the distribution of maximal entropy", Journal of Computational Physics, vol. 30, No. 2 (Feb. 1979), 9 pages.

(Continued)

*Primary Examiner* — Mohammad Ali
(74) *Attorney, Agent, or Firm* — ALSTON & BIRD LLP

(57) ABSTRACT

A method is provided for automatically creating road and lane geometry from images representing probe data within a geographical area using data aggregation and conflation. Methods may include: receiving first observation data associated with a geographic area; processing the first observation data through a first encoder to produce first embeddings; receiving second observation data associated with the geographic area; processing the second observation data through a second encoder to produce second embeddings; establishing contrastive loss between the first embeddings and the second embeddings; producing consistent embeddings from the first embeddings and the second embeddings using the contrastive loss; generating, from the consistent embeddings, map data reflecting the first observation data and the second observation data; and updating a map database with the map data.

19 Claims, 7 Drawing Sheets

(51) Int. Cl.
*G06V 10/77* (2022.01)
*G06V 10/82* (2022.01)

(52) U.S. Cl.
CPC ..... *G01C 21/3848* (2020.08); *G01C 21/3852* (2020.08); *G06F 16/29* (2019.01); *G06V 10/7715* (2022.01); *G06V 10/82* (2022.01); *G01C 21/3867* (2020.08)

(58) Field of Classification Search
CPC ............... G01C 21/3867; G06F 16/29; G06V 10/7715; G06V 10/82
USPC .......................................................... 700/28
See application file for complete search history.

(56) References Cited

U.S. PATENT DOCUMENTS

| | | |
|---|---|---|
| 9,177,404 B2 | 11/2015 | Ramachandran et al. |
| 9,658,074 B2 | 5/2017 | Dorum |
| 10,266,280 B2 | 4/2019 | Derenick et al. |
| 10,444,020 B2 | 10/2019 | Dorum |
| 10,546,400 B2 | 1/2020 | Dorum |
| 10,580,292 B2 | 3/2020 | Dorum |
| 10,760,920 B2 | 9/2020 | Sekiyama |
| 11,030,476 B2 | 6/2021 | Xu et al. |
| 11,068,515 B2 | 7/2021 | Bukowski |
| 11,093,760 B2 | 8/2021 | Savla et al. |
| 11,192,558 B2 | 12/2021 | Thompson |
| 11,209,548 B2 | 12/2021 | Yang et al. |
| 11,210,537 B2 | 12/2021 | Koivisto et al. |
| 11,227,500 B2 | 1/2022 | Wang |
| 11,244,500 B2 | 2/2022 | Marschner et al. |
| 2003/0009287 A1 | 1/2003 | Howard et al. |
| 2009/0210388 A1 | 8/2009 | Elson et al. |
| 2013/0033591 A1 | 2/2013 | Takahashi et al. |
| 2014/0219558 A1 | 8/2014 | Teng et al. |
| 2016/0239983 A1 | 8/2016 | Dorum et al. |
| 2016/0358477 A1 | 12/2016 | Ansari |
| 2017/0169313 A1 | 6/2017 | Choi et al. |
| 2017/0177933 A1 | 6/2017 | Mittal et al. |
| 2018/0003512 A1 | 1/2018 | Lynch |
| 2018/0107190 A1 | 4/2018 | Marshall et al. |
| 2019/0147320 A1 | 5/2019 | Mattyus et al. |
| 2019/0147331 A1* | 5/2019 | Arditi ................ G01C 21/32 706/20 |
| 2019/0170519 A1 | 6/2019 | Anwar et al. |
| 2019/0221033 A1 | 7/2019 | Messerlie et al. |
| 2019/0258878 A1 | 8/2019 | Koivisto et al. |
| 2019/0272434 A1 | 9/2019 | Dorum |
| 2019/0287393 A1 | 9/2019 | Fowe et al. |
| 2019/0325738 A1 | 10/2019 | Dorum |
| 2019/0355103 A1 | 11/2019 | Baek et al. |
| 2020/0302223 A1 | 9/2020 | Dutta et al. |
| 2020/0410274 A1 | 12/2020 | Satoh et al. |
| 2021/0012166 A1* | 1/2021 | Braley ................ G06F 18/251 |
| 2021/0019516 A1 | 1/2021 | Mittal et al. |
| 2021/0056847 A1 | 2/2021 | Saxena et al. |
| 2021/0113130 A1 | 4/2021 | Tran |
| 2021/0150278 A1* | 5/2021 | Dudzik .................. G06T 7/593 |
| 2021/0164787 A1 | 6/2021 | Soni et al. |
| 2021/0209368 A1 | 7/2021 | Hao et al. |
| 2021/0224466 A1 | 7/2021 | Nehrenberg et al. |
| 2021/0302170 A1* | 9/2021 | Xie .......................... G06F 16/23 |
| 2021/0325898 A1* | 10/2021 | Golov ................ G01C 21/3837 |
| 2021/0333124 A1* | 10/2021 | Heo .................. G08G 1/096844 |
| 2021/0342585 A1 | 11/2021 | Fleisig et al. |
| 2022/0113162 A1 | 4/2022 | Nomura |
| 2022/0156612 A1 | 5/2022 | Ren et al. |
| 2022/0198339 A1* | 6/2022 | Zhao ..................... G06F 18/214 |
| 2022/0277647 A1 | 9/2022 | Guo et al. |
| 2022/0366259 A1* | 11/2022 | Wang .................... G06N 3/082 |
| 2023/0213945 A1 | 7/2023 | Sajjan et al. |
| 2023/0221136 A1* | 7/2023 | Rodrigues .......... G01C 21/3852 701/450 |
| 2023/0252795 A1* | 8/2023 | Tong ..................... G06V 20/58 382/104 |

FOREIGN PATENT DOCUMENTS

| | | |
|---|---|---|
| EP | 3280974 A1 | 2/2018 |
| WO | WO 2011/023247 A1 | 3/2011 |
| WO | WO 2016/162665 A1 | 10/2016 |
| WO | WO 2021/002190 A1 | 1/2021 |

OTHER PUBLICATIONS

Alotaibi A., "Deep Generative Adversarial Networks for Image-to-Image Translation: A Review", Symmetry, vol. 12, No. 10, (Oct. 16, 2020), 26 pages.

Arman et al., "Lane-level routable digital map reconstruction for motorway networks using low-precision GPS data", Transportation Research Part C: Emerging Technologies, (Jun. 3, 2021), 21 pages.

Batra, A., "Road Topology Extraction from Satellite Images by Knowledge Sharing", International Institute of Information Technology, Deemed University, (Jul. 2019), 75 pages.

Biagioni et al., "Inferring Road Maps from Global Positioning System Traces: Survey and Comparative Evaluation", Department of Computer Science, University of Illinois at Chicago, (2012), 11 pages.

Chen et al., "Probabilistic Modeling of Traffic Lanes from GPS Traces", 18th ACM SIGSPATIAL International Symposium on Advances in Geographic Information Systems, ACM-GIS 2010, (Nov. 3-5, 2010), 8 pages.

Dorum, O., "Deriving Double-Digitized Road Network Geometry from Probe Data", SIGSPATIAL '17: Proceedings of the 25th ACM SIGSPATIAL International Conference on Advances in Geographic Information Systems, (Nov. 2017), 10 pages.

Hartmann et al., "Night time road curvature estimation based on convolutional neural networks", 2013 IEEE Intelligent Vehicles Symposium (IV), (Jun. 23-26, 2013), 6 pages.

He et al., "Sat2Graph: Road Graph Extraction through Graph-Tensor Encoding", arXiv:2007.09547v1, (Jul. 19, 2020), 17 pages.

Horritt et al., "Developing a Prototype Tool for Mapping Flooding From All Sources Phase 1: Scoping and Conceptual Method Development", Department for Environment Food and Rural Affairs, Flood and Coastal Erosion Risk Management Research and Development Programme, Environment Agency, (Mar. 2010), 179 pages.

Kaji et al., "Overview of Image-To-Image Translation by Use of Deep Neural Networks: Denoising, Super-Resolution, Modality Conversion, and Reconstruction in Medical Imaging", Radiological Physics and Technology 12(4), (Jun. 2019), 14 pages.

Kupyn et al., "DeblurGAN-v2: Deblurring (Orders-of-Magnitude) Faster and Better", 2019 IEEE/CVF International Conference on Computer Vision (ICCV), (2019), 10 pages.

Kupyn et al., "DeblurGAN: Blind Motion Deblurring Using Conditional Adversarial Networks", 2018 IEEE/CVF Conference on Computer Vision and Pattern Recognition, (Nov. 19, 2017), pp. 8183-8192.

Mi et al., "HDMapGen: A Hierarchical Graph Generative Model of High Definition Maps", 2021 IEEE/CVF Conference on Computer Vision and Pattern Recognition (CVPR), (Jun. 1, 2021), 10 pages.

Narayan et al., "Maximum Entropy Image Restoration in Astronomy", Annual Review of Astronomy and Astrophysics, vol. 24, No. 1, (Nov. 2003), 44 pages.

Redmon et al., "YOLO: Real-Time Object Detection", Retrieved on Oct. 18, 2022, Retrieved from the Internet: URL<https://pjreddie.com/darknet/yolo>, (2018), 9 pages.

Spolti et al., "Application of U-Net and Auto-Encoder to the Road/Non-Road Classification of Aerial Imagery in Urban Environments", 15th International Conference on Computer Vision Theory and Applications, (Jan. 2020), 8 pages.

Vu, "Vehicle Perception: Localization, Mapping with Detection, Classification and Tracking of Moving Objects", Computer Science, Institut National Polytechnique de Grenoble—INPG, (2009), 127 pages.

Xiao et al., "VAE-info-cGAN: generating synthetic images by combining pixel- level and feature-level geospatial conditional inputs", arXiv:2012.04196v1, (Dec. 8, 2020), 10 pages.

(56) References Cited

OTHER PUBLICATIONS

Zhang et al., "A Fast Learning Method for Accurate and Robust Lane Detection Using Two-Stage Feature Extraction with YOLO v3", Sensors 2018 (Dec. 6, 2018), 20 pages.
U.S. Appl. No. 17/662,165, filed May 5, 2022, entitled, "Method, Apparatus, And Computer Program Product For Map Data Generation From Probe Data Imagery", 43 pages.
U.S. Appl. No. 17/662,129, filed May 5, 2022, entitled, "Method, Apparatus, And Computer Program Product For Map Geometry Generation Based On Object Detection", 40 pages.
U.S. Appl. No. 17/662,158, filed May 5, 2022, entitled, "Method, Apparatus, And Computer Program Product For Probe Data-Based Geometry Generation", 35 pages.
U.S. Appl. No. 17/662,151, filed May 5, 2022, entitled, "Method, Apparatus, And Computer Program Product For Map Geometry Generation Based On Data Aggregation And Conflation With Statistical Analysis", 35 pages.
U.S. Appl. No. 17/662,136, filed May 5, 2022, entitled, "Method, Apparatus, And Computer Program Product For Lane Geometry Generation Based On Graph Estimation", 40 pages.
Non-Final Office Action for U.S. Appl. No. 17/662,129 dated Aug. 24, 2023.
Non-Final Office Action for U.S. Appl. No. 17/662,158 dated Sep. 13, 2023.
Non-Final Office Action for U.S. Appl. No. 17/662,136 dated Sep. 14, 2023.
Extended European Search Report for European Application No. 23171578.0 dated Oct. 10, 2023, 8 pages.
Extended European Search Report for European Application No. 23171576.4 dated Oct. 6, 2023, 9 pages.
Extended European Search Report for European Application No. 23171637.4 dated Oct. 19, 2023, 7 pages.
Extended European Search Report for European Application No. 23171632.5 dated Oct. 10, 2023, 8 pages.
Final Office Action for U.S. Appl. No. 17/662,129 dated Feb. 15, 2024.
Final Office Action for U.S. Appl. No. 17/662,136 dated Mar. 27, 2024.
Non-Final Office Action for U.S. Appl. No. 17/662,158 dated Mar. 27, 2024.
Advisory Action for U.S. Appl. No. 17/662,129 dated Apr. 25, 2024.
Final Office Action for U.S. Appl. No. 17/662,165 dated Jan. 27, 2025.
Non-Final Office Action for U.S. Appl. No. 17/662,165 dated Sep. 6, 2024.
Non-Final Office Action for U.S. Appl. No. 17/662,129 dated Jun. 5, 2024.
Non-Final Office Action for U.S. Appl. No. 17/662,136 dated Sep. 10, 2024.
Non-Final Office Action for U.S. Appl. No. 17/662,151 dated Sep. 27, 2024.
Non-Final Office Action for U.S. Appl. No. 17/662,158 dated Sep. 25, 2024.
Notice of Allowance for U.S. Appl. No. 17/662,129 dated Dec. 9, 2024.
Notice of Allowance for U.S. Appl. No. 17/662,136 dated Dec. 23, 2024.
Notice of Allowance for U.S. Appl. No. 17/662,151 dated Dec. 20, 2024.
Advisory Action for U.S. Appl. No. 17/662,165 dated Apr. 18, 2025.
Final Office Action for U.S. Appl. No. 17/662,158 dated Mar. 18, 2025.
Advisory Action for U.S. Appl. No. 17/662,158 dated May 15, 2025.
Zhang, Ying, et al. "An enhanced GAN model for automatic satellite-to-map image conversion." IEEE 2020 (Year: 2020).
Non-Final Office Action for U.S. Appl. No. 17/662,165 dated May 28, 2025.
Notice of Allowance for U.S. Appl. No. 17/662,165 dated Nov. 12, 2025.
Notice of Allowance for U.S. Appl. No. 17/662,158 dated Oct. 30, 2025.

* cited by examiner

METHOD, APPARATUS, AND COMPUTER PROGRAM PRODUCT FOR MAP GEOMETRY GENERATION BASED ON DATA AGGREGATION AND CONFLATION

TECHNOLOGICAL FIELD

An example embodiment of the present disclosure relates to the generation of map geometry, and more particularly, to automatically map geometry from various data sources representing data from a geographical area using data aggregation and conflation.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry. Incorrect lane geometry information can be problematic as such lane geometry may be used for route guidance and at least semi-autonomous vehicle control. Inaccurate lane geometries can reduce the effectiveness of route guidance and vehicle autonomy.

BRIEF SUMMARY

A method, apparatus, and computer program product are provided in accordance with an example embodiment for the generation of map geometry, and more particularly, to automatically map geometry from various data sources representing data from a geographical area using data aggregation and conflation. Embodiments provided herein include an apparatus having at least one processor and at least one memory including computer program code with the at least one memory and computer program code being configured to, with the processor, cause the apparatus to: receive first observation data associated with a geographic area; process the first observation data through a first encoder to produce first embeddings; receive second observation data associated with the geographic area; process the second observation data through a second encoder to produce second embeddings; establish contrastive loss between the first embeddings and the second embeddings; produce consistent embeddings from the first embeddings and the second embeddings using the contrastive loss; generate, from the consistent embeddings, map data reflecting the first observation data and the second observation data; and update a map database with the map data.

According to some embodiments, causing the apparatus to generate, from the consistent embeddings, map data reflecting the first observation data and the second observation data includes causing the apparatus to: generate, from the consistent embeddings, map data reflecting the first observation data and the second observation data; determine a loss of the map data relative to ground truth data; and update a map generator generating the map data using the loss. The contrastive loss of an example embodiment is determined using a contrastive language image pre-training (CLIP) loss function. According to some embodiments, the first observation data associated with the geographic area includes at least one of aerial image data, probe data, LiDAR (Light Distancing and Ranging) data, or vehicle image sensor data, where the second observation data associated with the geographic area includes at least one of aerial image data, probe data, LiDAR data, or vehicle image sensor data different from the first observation data.

According to certain embodiments, causing the apparatus to establish contrastive loss between the first embeddings and the second embeddings includes causing the apparatus to establish contrastive loss between two different types of data from two different sources of data. The first encoder of an example embodiment is a neural network that transforms the first observation data into the first embeddings, while the second encoder of an example embodiment is a neural network that transforms the second observation data into the second embeddings. According to some embodiments, causing the apparatus to produce consistent embeddings from the first embeddings and the second embeddings using the contrastive loss includes causing the apparatus to: align the first embeddings with the second embeddings based on the contrastive loss; and generate the consistent embeddings based on the first observation data of a first data type and the second observation data of a second data type, different from the first data type. According to certain embodiments, the first observation data is received in at least near real-time and assembled into batches, where causing the apparatus to process the first observation data through the first encoder to produce the first embeddings includes causing the apparatus to process a batch of the first observation data through the first encoder to produce the first embeddings.

Embodiments provided herein include a method including: receiving first observation data associated with a geographic area; processing the first observation data through a first encoder to produce first embeddings; receiving second observation data associated with the geographic area; processing the second observation data through a second encoder to produce second embeddings; establishing contrastive loss between the first embeddings and the second embeddings; producing consistent embeddings from the first embeddings and the second embeddings using the contrastive loss; generating, from the consistent embeddings, map data reflecting the first observation data and the second observation data; and updating a map database with the map data.

According to some embodiments, generating, from the consistent embeddings, map data reflecting the first observation data and the second observation data includes: generating, from the consistent embeddings, map data reflecting the first observation data and the second observation data; determining a loss of the map data relative to ground truth data; and updating a map generator generating the map data using the loss. The contrastive loss of an example embodiment is determined using a contrastive language image pre-training (CLIP) loss function. The first observation data associated with the geographic area includes, in some embodiments, at least one of aerial image data, probe data, LiDAR data, or vehicle image sensor data, where the second observation data associated with the geographic area includes, in some embodiments, at least one of aerial image data, probe data, LiDAR data, or vehicle image sensor data different from the first observation data.

According to certain embodiments, establishing contrastive loss between the first embeddings and the second embeddings includes establishing contrastive loss between two different types of data from two different sources of data. According to some embodiments, the first encoder is a neural network that transforms the first observation data into the first embeddings and the second encoder is a neural network that transforms the second observation data into the second embeddings. Producing consistent embeddings from the first embeddings and the second embeddings using the contrastive loss includes, in some embodiments, aligning the first embeddings with the second embeddings based on the contrastive loss; and generating the consistent embeddings based on the first observation data of a first data type and the second observation data of a second data type, different from the first data type. The first observation data is received, in some embodiments, in at least near real-time and assembled into batches, where processing the first observation data through the first encoder to produce the first embeddings includes processing a batch of the first observation data through the first encoder to produce the first embeddings.

Embodiments provided herein include a computer program product including at least one non-transitory computer-readable storage medium having computer-executable program code instructions stored therein, the computer-executable program code instructions including program code instructions to: receive first observation data associated with a geographic area; process the first observation data through a first encoder to produce first embeddings; receive second observation data associated with the geographic area; process the second observation data through a second encoder to produce second embeddings; establish contrastive loss between the first embeddings and the second embeddings; produce consistent embeddings from the first embeddings and the second embeddings using the contrastive loss; generate, from the consistent embeddings, map data reflecting the first observation data and the second observation data; and update a map database with the map data.

According to some embodiments, the program code instructions to generate, from the consistent embeddings, map data reflecting the first observation data and the second observation data include program code instructions to: generate, from the consistent embeddings, map data reflecting the first observation data and the second observation data; determine a loss of the map data relative to ground truth data; and update a map generator generating the map data using the loss. The contrastive loss of an example embodiment is determined using a contrastive language image pre-training (CLIP) loss function. According to some embodiments, the first observation data associated with the geographic area includes at least one of aerial image data, probe data, LiDAR (Light Distancing and Ranging) data, or vehicle image sensor data, where the second observation data associated with the geographic area includes at least one of aerial image data, probe data, LiDAR data, or vehicle image sensor data different from the first observation data.

According to certain embodiments, the program code instructions to establish contrastive loss between the first embeddings and the second embeddings include program code instructions to establish contrastive loss between two different types of data from two different sources of data. The first encoder of an example embodiment is a neural network that transforms the first observation data into the first embeddings, while the second encoder of an example embodiment is a neural network that transforms the second observation data into the second embeddings. According to some embodiments, the program code instructions to produce consistent embeddings from the first embeddings and the second embeddings using the contrastive loss include program code instructions to: align the first embeddings with the second embeddings based on the contrastive loss; and generate the consistent embeddings based on the first observation data of a first data type and the second observation data of a second data type, different from the first data type. According to certain embodiments, the first observation data is received in at least near real-time and assembled into batches, where the program code instructions to process the first observation data through the first encoder to produce the first embeddings include program code instructions to process a batch of the first observation data through the first encoder to produce the first embeddings. Embodiments described herein further include a computer program product having computer-executable program code portions stored therein, the computer executable program code portions including program code instructions configured to perform any method described herein.

Embodiments provided herein include an apparatus including: means for receiving first observation data associated with a geographic area; means for processing the first observation data through a first encoder to produce first embeddings; means for receiving second observation data associated with the geographic area; means for processing the second observation data through a second encoder to produce second embeddings; means for establishing contrastive loss between the first embeddings and the second embeddings; means for producing consistent embeddings from the first embeddings and the second embeddings using the contrastive loss; means for generating, from the consistent embeddings, map data reflecting the first observation data and the second observation data; and means for updating a map database with the map data.

According to some embodiments, the means for generating, from the consistent embeddings, map data reflecting the first observation data and the second observation data includes: means for generating, from the consistent embeddings, map data reflecting the first observation data and the second observation data; means for determining a loss of the map data relative to ground truth data; and means for updating a map generator generating the map data using the loss. The contrastive loss of an example embodiment is determined using a contrastive language image pre-training (CLIP) loss function. The first observation data associated with the geographic area includes, in some embodiments, at least one of aerial image data, probe data, LiDAR data, or vehicle image sensor data, where the second observation data associated with the geographic area includes, in some embodiments, at least one of aerial image data, probe data, LiDAR data, or vehicle image sensor data different from the first observation data.

According to certain embodiments, the means for establishing contrastive loss between the first embeddings and the second embeddings includes means for establishing contrastive loss between two different types of data from two different sources of data. According to some embodiments, the first encoder is a neural network that transforms the first observation data into the first embeddings and the second encoder is a neural network that transforms the second observation data into the second embeddings. The means for producing consistent embeddings from the first embeddings and the second embeddings using the contrastive loss includes, in some embodiments, means for aligning the first embeddings with the second embeddings based on the contrastive loss; and means for generating the consistent embeddings based on the first observation data of a first data type and the second observation data of a second data type, different from the first data type. The first observation data is received, in some embodiments, in at least near real-time and assembled into batches, where the means for processing the first observation data through the first encoder to produce the first embeddings includes means for processing a batch of the first observation data through the first encoder to produce the first embeddings.

Embodiments provided herein include a system for the generation of map data including: at least one memory including a map database stored therein; and processing circuitry configured to: receive first observation data associated with a geographic area; process the first observation data through a first encoder to produce first embeddings; receive second observation data associated with the geographic area; process the second observation data through a second encoder to produce second embeddings; establish contrastive loss between the first embeddings and the second embeddings; produce consistent embeddings from the first embeddings and the second embeddings using the contrastive loss; generate, from the consistent embeddings, map data reflecting the first observation data and the second observation data; and update the map database with the map data.

According to some embodiments, the processing circuitry configured to generate, from the consistent embeddings, map data reflecting the first observation data and the second observation data includes processing circuitry configured to: generate, from the consistent embeddings, map data reflecting the first observation data and the second observation data; determine a loss of the map data relative to ground truth data; and update a map generator generating the map data using the loss. The contrastive loss of an example embodiment is determined using a contrastive language image pre-training (CLIP) loss function. According to some embodiments, the first observation data associated with the geographic area includes at least one of aerial image data, probe data, LiDAR (Light Distancing and Ranging) data, or vehicle image sensor data, where the second observation data associated with the geographic area includes at least one of aerial image data, probe data, LiDAR data, or vehicle image sensor data different from the first observation data.

According to certain embodiments, the processing circuitry configured to establish contrastive loss between the first embeddings and the second embeddings includes processing circuitry configured to establish contrastive loss between two different types of data from two different sources of data. The first encoder of an example embodiment is a neural network that transforms the first observation data into the first embeddings, while the second encoder of an example embodiment is a neural network that transforms the second observation data into the second embeddings. According to some embodiments, the processing circuitry configured to produce consistent embeddings from the first embeddings and the second embeddings using the contrastive loss includes processing circuitry configured to: align the first embeddings with the second embeddings based on the contrastive loss; and generate the consistent embeddings based on the first observation data of a first data type and the second observation data of a second data type, different from the first data type. According to certain embodiments, the first observation data is received in at least near real-time and assembled into batches, where the processing circuitry configured to process the first observation data through the first encoder to produce the first embeddings includes processing circuitry configured to process a batch of the first observation data through the first encoder to produce the first embeddings.

BRIEF DESCRIPTION OF THE DRAWINGS

Figure 1:
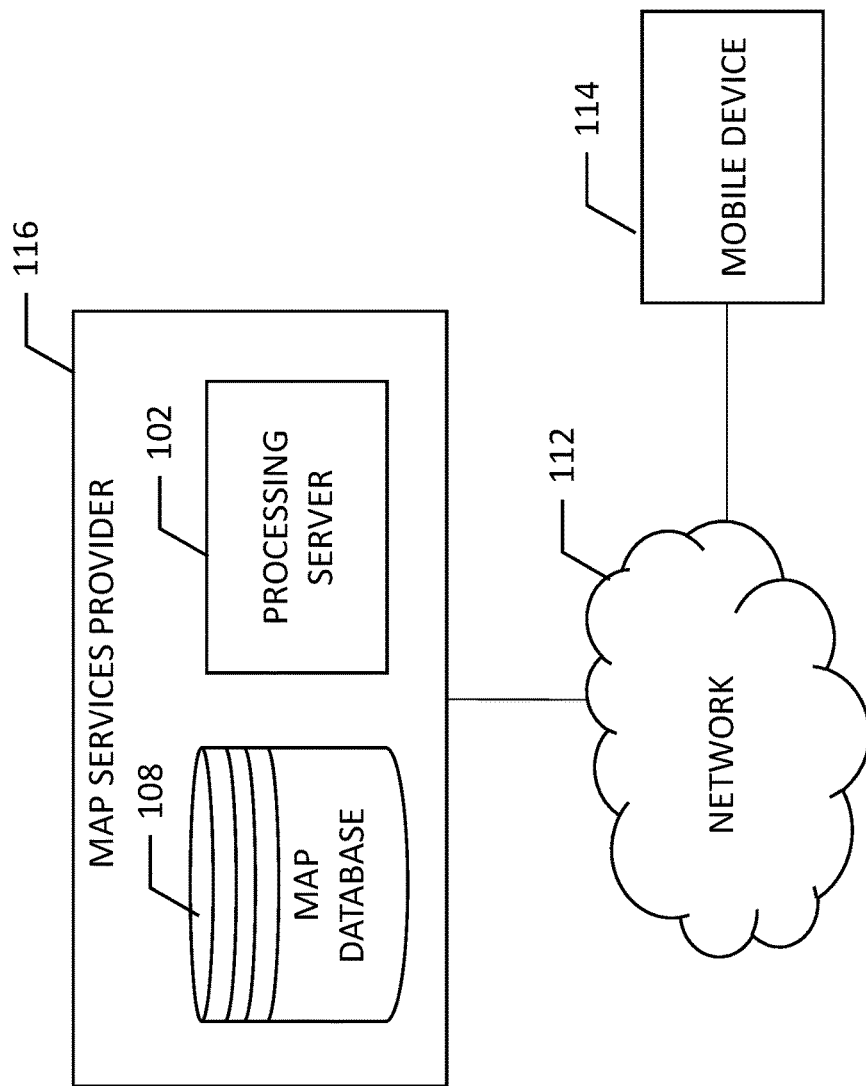
Figure 2:
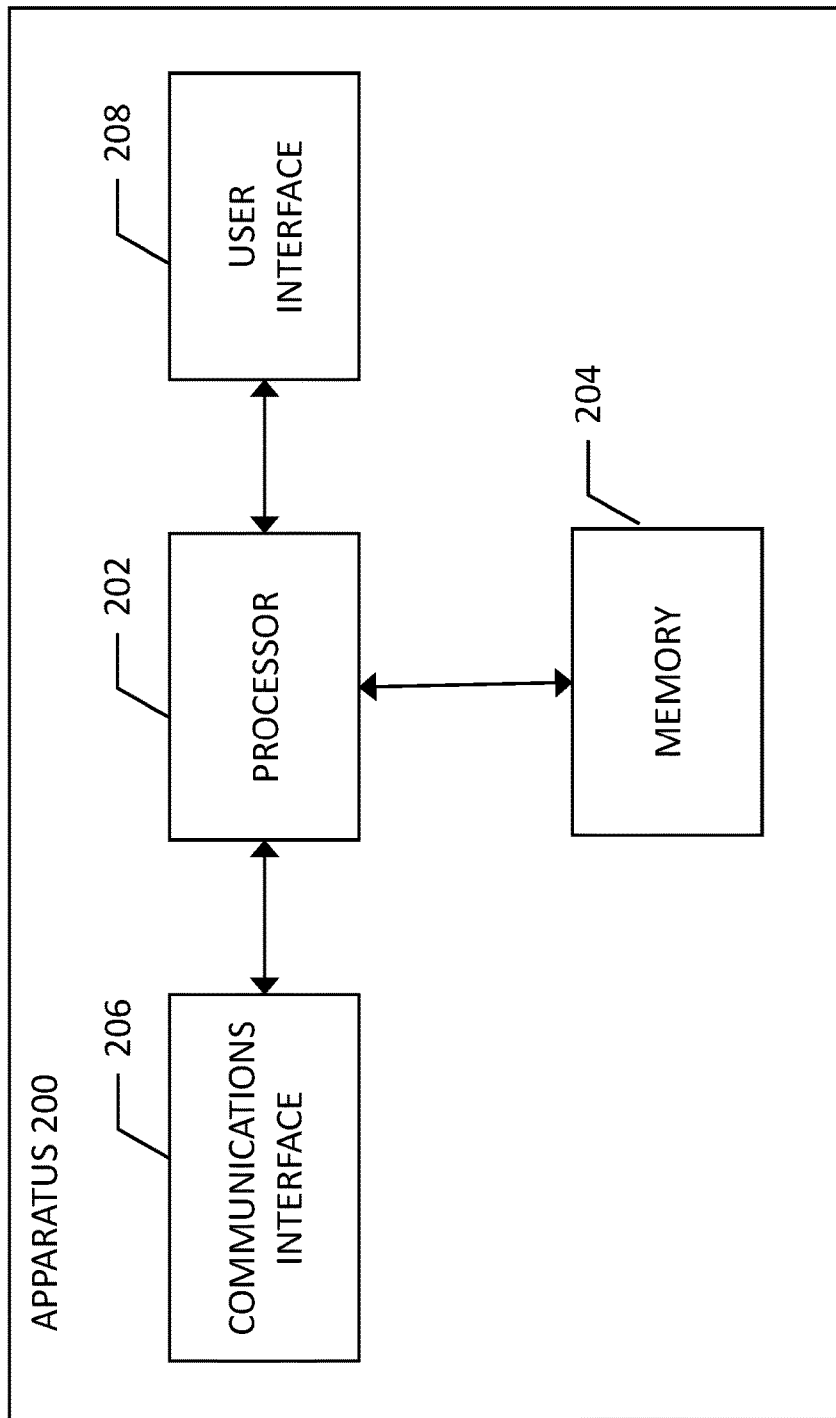
Figure 3:
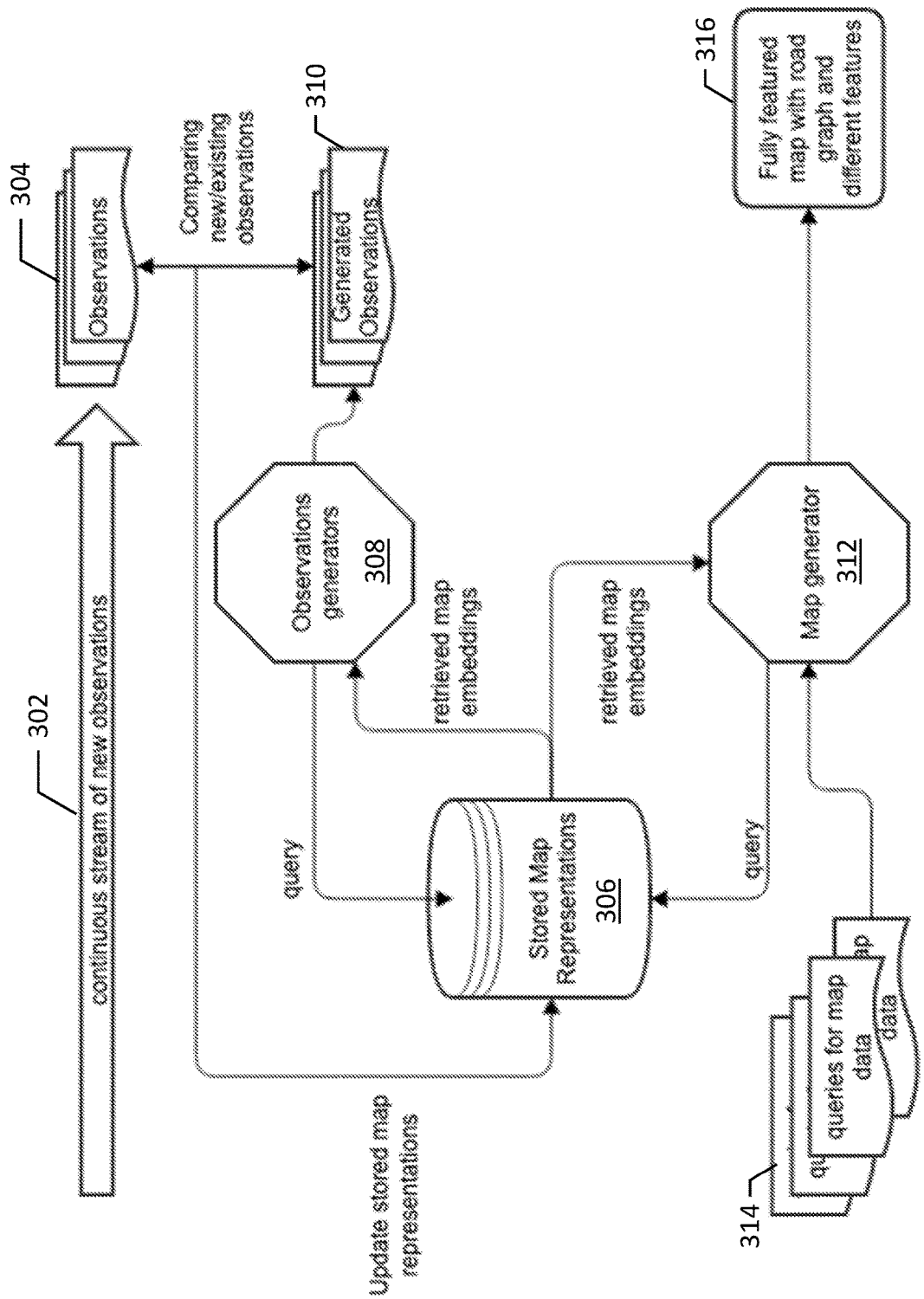
Figure 4:
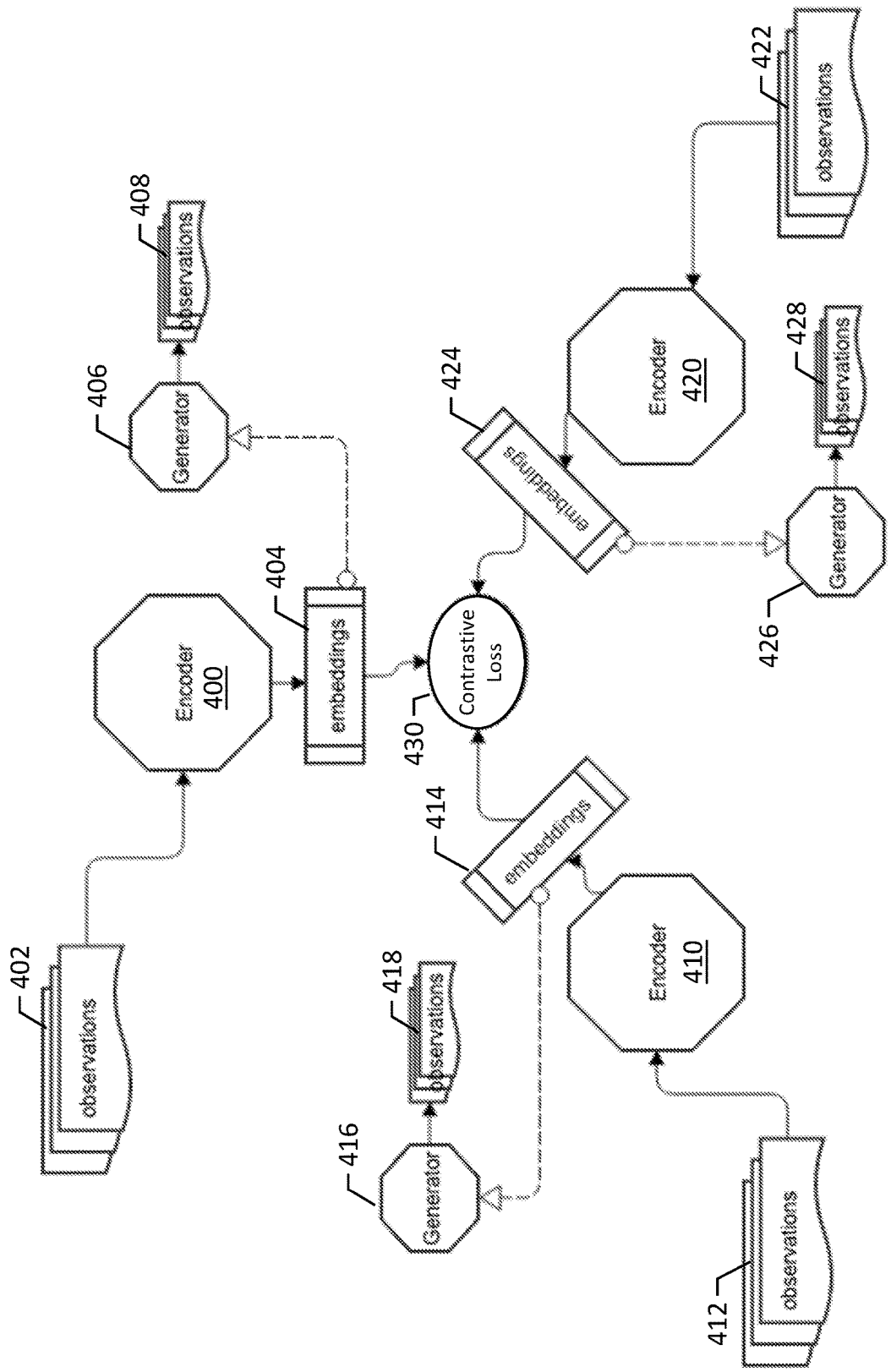
Figure 5:
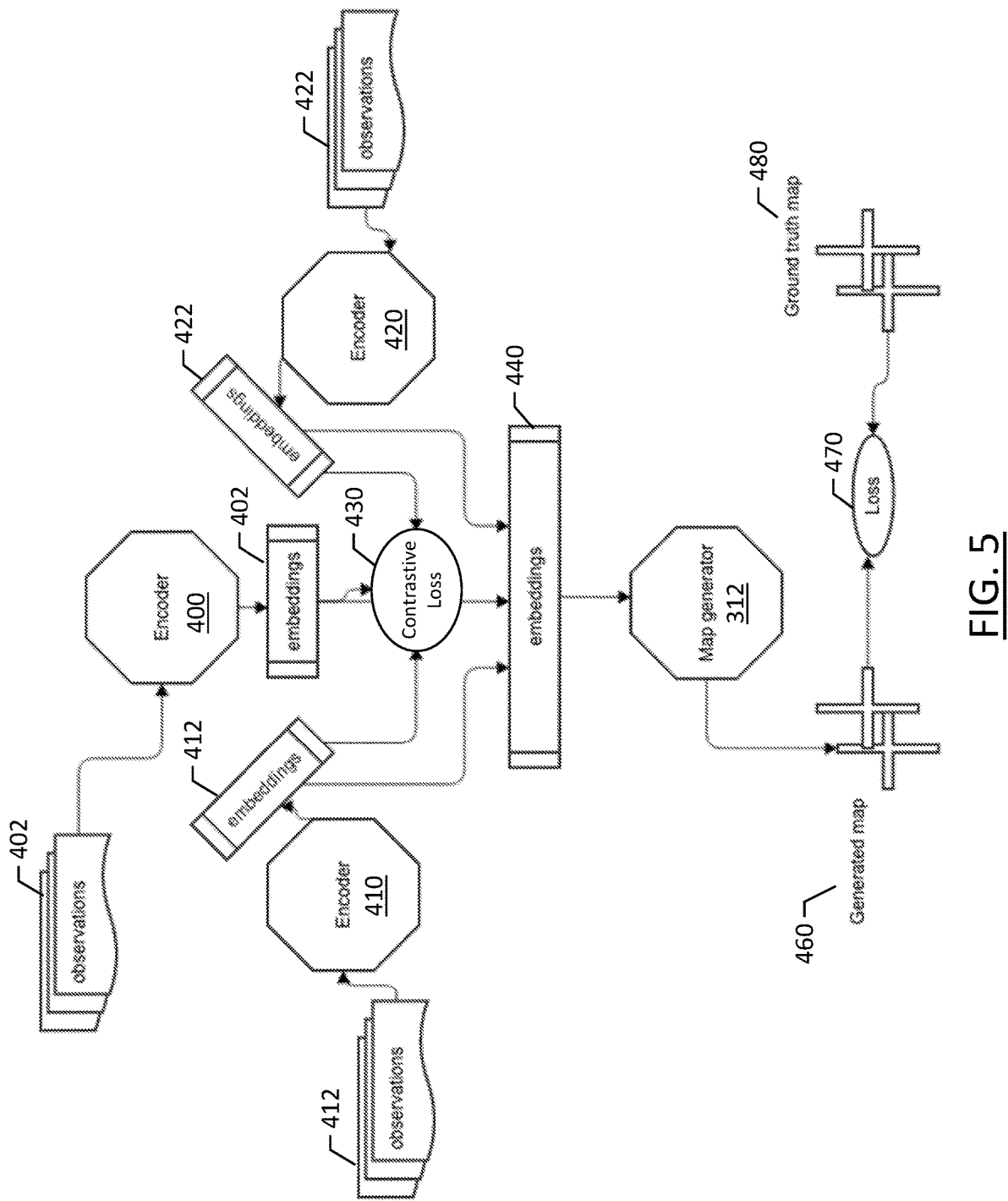
Figure 6:
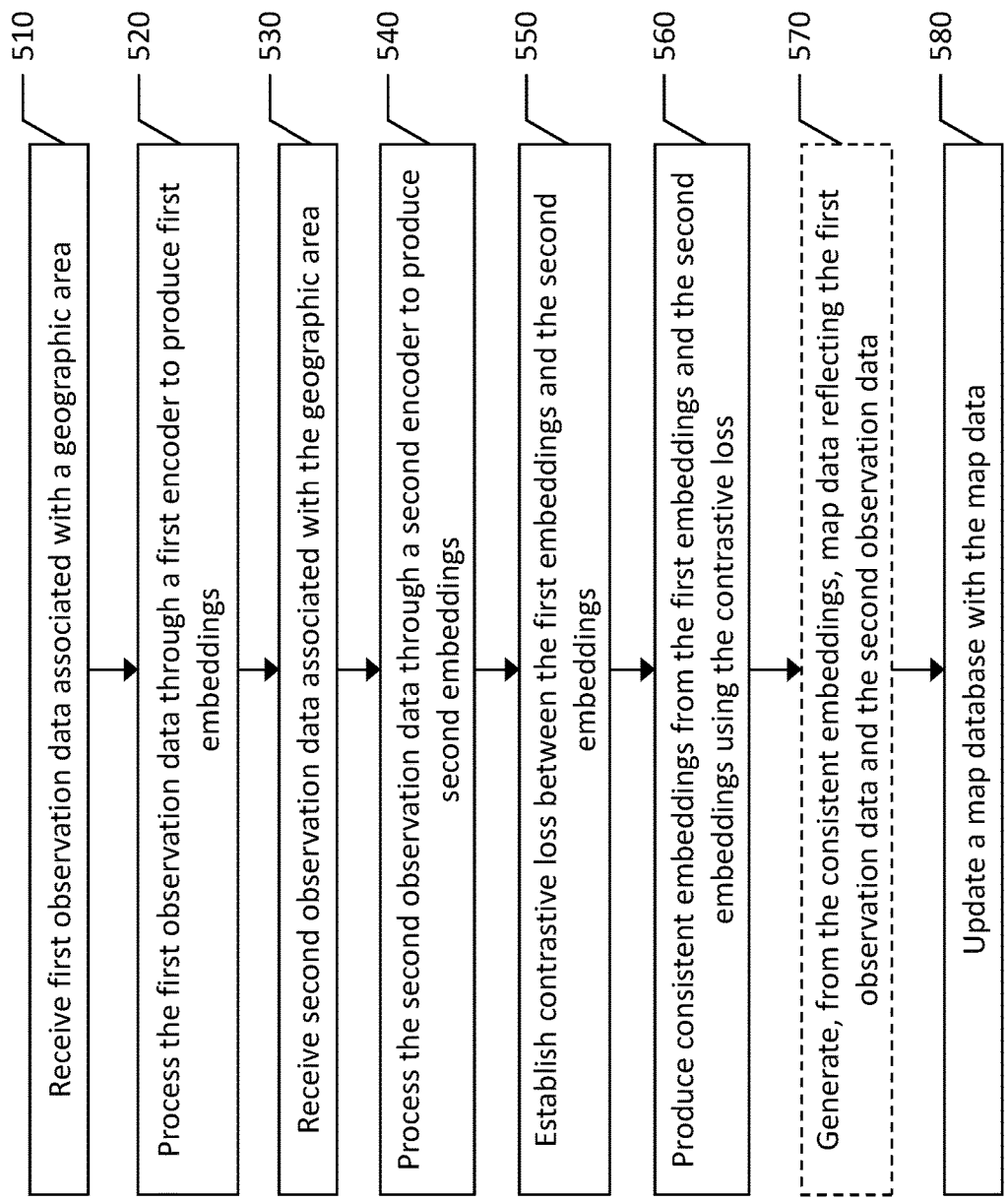
Figure 7:
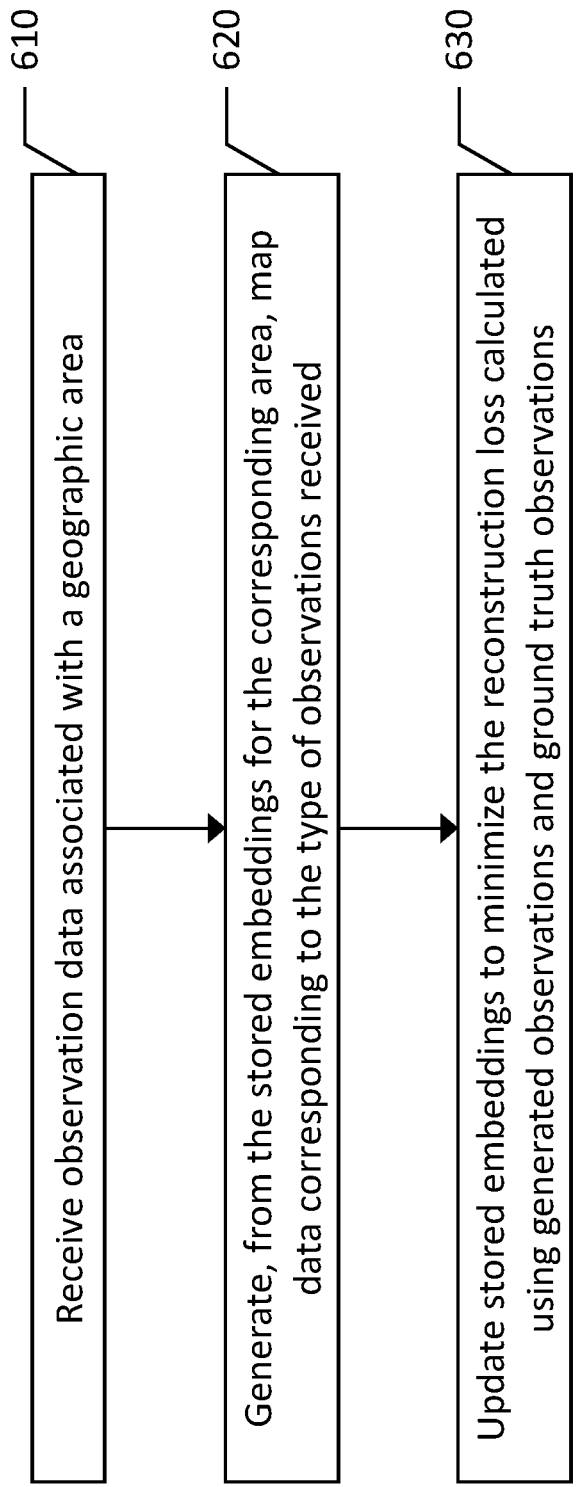

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for processing data from a variety of sources according to an example embodiment of the present disclosure;

FIG. 3 illustrates a block diagram of a map generation and maintenance framework in which a continuous stream of new observations are received, such as from vehicles traveling within a road network, and used to update neural map representations and generate map contents, according to an example embodiment of the present disclosure;

FIG. 4 is a block diagram of the encoder framework for processing observations and establishing a contrastive loss according to an example embodiment of the present disclosure;

FIG. 5 is a block diagram of the encoder framework and map generator for generating map geometry according to an example embodiment of the present disclosure;

FIG. 6 is a flowchart of a method of determining object location within map geometry based on data aggregation and conflation according to an example embodiment of the present disclosure; and FIG. 7 is a flowchart of a method of determining object location within map geometry based on received observations within a geographic area according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for generating and correcting map geometry within map data, and more particularly, to generation of map geometry and objects including road and lane geometry through data analysis based on data aggregation and conflation of data from multiple sources. Road segment paths and lane line geometry are often generated through automated means. However, manual verification and correction is often necessary due to the unique properties of roads in different and unique contexts. As such, even automated means rely heavily on manual processes that are laborious, time intensive, and costly. Because millions of miles of roads exist, the determination of road segment and lane line geometry can be a tedious process. Embodiments described herein provide a reliable manner of generating map geometry through the aggregation of data from various sources in various formats and using conflation to generate one set of map geometries that represents the real-world objects without duplication. The observations or gathered data (e.g., crowdsourced) can be represented in various formats, such as images, extracted analytical geometries, or probe densities that could be overlapping in terms of coverage.

Embodiments receive observations represented in analytical geometries that are highly overlapping. For example, a point object (e.g., a telephone pole) can be observed in different source data and appear in the set of observations from different sources multiple times, each occurrence having some degree of variation to the actual position of the true object. Further, different parts of one object may occur multiple times in the observation set. Embodiments generate from this data one set of geometries which represents the real world objects without duplication.

For example, map data can be gathered as probe data represented as tabular data that is rasterized to generate images from the probe data to define various aspects of map geometry such as road segment paths, lane line geometry, object detection, traffic determination, and the like. Images are generated from probe data through rasterization of available probe data to generate a graphical representation of probe data that can be used in a variety of processes including in embodiments described herein for aggregation and conflation to extract map geometry. Other forms of gathered data can be aggregated for map generation as described herein. For example, aerial images (e.g., satellite or aircraft collected images), analytical geometries, dashboard cameras, LiDAR sensors, etc. Embodiments described herein can extend beyond map object data to be applied to points of interest (POIs), building facades, road signs, etc. A first data source can include vehicle mounted cameras such as dash cams, Mobileye cameras, etc. A second data source can include a mobile device such as a smartphone performing visual positioning system requests. Both data sources can employ use-case specific networks for detecting features and identifying the same object within their respective data and generating corresponding embeddings. These embeddings can be contrasted as described herein.

Embodiments employ an end-to-end approach taking raw data, such as aerial images, probe densities, analytical geometries, or observations of any other format as inputs and generate analytical geometries as output. Embodiments use multiple sub modules that process data in different input formats and a mechanism to update map content in a consistent and automatic manner.

As technology advances, the data available for collection has increased in volume, such as with location data from personal hand-held devices and vehicles. Further, data from sensors attached to located vehicles (e.g., image sensors, LiDAR (Light Distancing and Ranging), etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming.

Generating map data such as road or lane geometries and traffic volumes thereon directly from probe data is challenging. Probe data refers to any data containing a location (e.g., longitude and latitude, such as Global Positioning System coordinates or GNSS coordinates, cartesian coordinates, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is challenging.

Probe data is often very noisy and often sparse for less traveled roads such as residential roads. The use of analytical techniques to create road geometry struggles to create usable road geometry under sparse and noisy probe conditions, and suffers from a large number of hyper parameters that need to be tuned. Using analytical techniques to create lane geometry or paint marking geometry from probe data is practically infeasible due to the fact that consumer grade global positioning systems have a noise level that exceeds the width of a lane, and thus is ineffective at identifying the correct lane of travel.

The collection of rich sensor data from vehicles traveling within a road network, such as image data (e.g., 360-degree camera views) and LiDAR requires expensive sensor arrays associated with vehicles traveling within a road network. While such technology is being adopted at an ever-increasing rate, this sensor data still has limited coverage relative to the total volume of roads that exist. Sensor arrays of a vehicle can differ among model years and among different manufacturers or OEMs (Original Equipment Manufacturers). These sensor arrays can include cameras, LiDAR, Radar, etc., but due to different technological configurations, data characteristics may vary between different vehicles, between different OEMs, and between model years, for instance. Hence, data received from a first sensor of a first vehicle or OEM may require different processing than data received from a second sensor of a second vehicle or OEM. Further, significant manual effort is still required to derive lane geometry and attributes such as lane count and turn lane data from sensor rich data. Enabling full automation of the creation of high definition (HD) maps including lane geometry and selected attributes from probe data provides improved HD map coverage and enhanced safety functionality. Embodiments described herein aggregate data from different sources with different levels of detail and accuracy to conflate the data and obtain a more accurate estimation of map geometry than any one source of data may provide. Further, embodiments automate this map geometry generation to enable rapid map updates, including real-time or near real-time dynamic data such as traffic, without necessitating manual input.

FIG. 1 illustrates a communication diagram of an example embodiment of a system for implementing example embodiments described herein. The illustrated embodiment of FIG. 1 includes a map services provider 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and LiDAR sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The processing server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory 204, and/or the like).

Embodiments described herein aggregate data from probe data and other data sources that can be used for map generation and healing, along with establishing dynamic map data. Embodiments aggregate data from different sources in different formats, process the map data through format-specific modules, and conflate the data to arrive at updated map content in a consistent and automatic manner that eliminates duplicative elements and maintains consistency across data formats. For map generation, different data sources are better suited to different types of data. Static map data reflects seldom-changing features, while dynamic map data reflects often-changing features in the map data. As used herein, the term static map data or substantially static map data references map data that does not regularly change, but can change over time such as when road paths change due to construction or long-term road closures. Conversely, dynamic map data references map data that changes regularly, such as traffic map data, temporary lane closures, accidents, and the like, that generally last less than a few hours. Thus, static map data can be considered map data that is persistent for twenty four hours or longer, while dynamic map data generally changes over time periods of less than twenty four hours.

The overall architecture of embodiments described herein includes map content stored as learned embeddings. Human readable maps with road graph and other features are generated with a learned map generator using stored map embeddings as inputs. Map embeddings are updated in a continuous or substantially continuous fashion with streaming new observations from probe data and other data sources that travel throughout a road network and capture images and other sensor data of road networks over time.

According to example embodiments described herein, the general framework includes components where each component can include multiple modules. Stored map representations can be considered a matrix generated from a metric. Such a representation is an abstract representation with as much information about an associated geographic area as possible. An example map representation stored in a database includes a vector with thousands of dimensions for a geographic area or "tile" which may cover three kilometers by three kilometers of area. The vector for such an area can include, for example, thousands of dimensions to describe the map information in the geographic area. The information in the form of observations includes lane markings, pole objects, sign objects, road boundaries, etc. These observations are obtained in different formats such as through vehicle data, image data, LiDAR data, etc. with vehicle probe data received in real-time with such observations.

FIG. 3 illustrates an example embodiment in which a continuous stream of new observations 302 are received, such as from vehicles traveling within a road network. This continuous stream of new observations can be in real-time to benefit dynamic map data. Further, these real-time new observations can be used for map generation, map healing, and localization of the vehicle or device gathering the observations. The gathered observations are compared to existing observations to identify any changes. The received observations 304 are provided to stored map representations 306 which is the current understanding of the mapped region. Embodiments aim to update the map representation if there is a change, such as if a new construction site or traffic issue is identified, embodiments incorporate this data into the stored map representation as soon as possible. This is performed through observation generators 308.

The continuous stream of new observations can be in the form of real-time or near real-time data, where real-time is substantially instantaneous, while near real-time is within a matter of seconds or potentially within a few minutes. These observations can inform dynamic map data, such as traffic, new construction zones, lane changes, etc. Optionally, the stream of new observations can be gathered into batches for processing. For example, observations can be received over the course of a period of time, and the observations processed through embodiments described below in batches. The period of time can be dependent upon a volume of data received or can be associated with functional classifications of roads along which the data is received. A stream of new observations from a rural area or roads with low levels of traffic (e.g., residential roads) may be gathered over a relatively longer period of time to aggregate a batch of observations, while a stream of new observations from an urban area or roads with high levels of traffic (e.g., highways) can aggregate a batch of observations over a relatively shorter period of time.

Observations can include data from a variety of sources, with different generators used for each type of observational data. An observation of an example embodiment includes an aerial or satellite image for a specific area (e.g., 10-meters× 10-meters). The partial map embedding is retrieved from stored map representations at 306 and fed into observation generators 308. For a satellite image, an image network may be used to reconstruct the image. For probe data as an observation, a graph neural network can be employed as the generator. The observation generators 308 for the satellite image generate a second image, compared with the real satellite image and discrepancies measured with a loss function. The observation generators 308 may not generate a realistic representation such that the discrepancies can be measured with the loss function. With the loss function, the stored map representations 306 can be updated. With the observations generators 308 kept fixed, the stored map representations 306 will be updated by minimizing the reconstruction loss between the generated map observations 310 and the received observations 304.

The stored map representations 306 require further processing to be used in the actual maps. To do this, a map generator 312 is employed. The map generator 312 generates map objects, such as line objects (e.g., lane markings, road boundaries, etc.) and point objects (e.g., poles, signs, etc.). The map generator 312 is a collection of map generators, with one generator for each type of map data that is generated (point objects, line objects, cross-sections, etc.). A query for map data 314 is received into the map generator 312, where the query is a bounding box of an area. The map generator queries the stored map representations for the specific area of the query, where the retrieved map embeddings for that query area are fed into the map generator 312. This may be in the form of a matrix, for example. The map generator 312 generates the map objects as line segments, signs, poles, etc. as outputs necessary for HD feature maps, where they are used to generate, update, and heal fully featured maps with road graphs and different features 316.

While FIG. 3 illustrates the overall architecture of example embodiments, the stored map representations 306 can be further defined by the architecture illustrated in FIG. 4. This architecture involves the initialization of the map embeddings. Complementary information from multiple sources is merged to enrich the embeddings. Different sources such as satellite images, dashboard cameras, adaptive cruise control sensors (e.g., LiDAR, radar, image sensors), and probe data (e.g., vehicle position, time, heading, speed, etc.) can each be used to enrich the embeddings of the stored map representations. Embodiments can optionally employ contrastive learning or "CLIP" (Contrastive Language-Image Pre-training) which builds on zero-shot transfer, natural language supervision, and multimodal learning. CLIP efficiently learns visual concepts from natural language supervision and can be applied to any visual classification benchmark by providing names of the visual categories to be recognized. While an example embodiment described above employs CLIP contrastive learning, other embodiments can employ other contrastive losses such as CLOOB (Contrastive Leave One Out Boost), MOCO (Momentum Contrast), or simplified MOCO, for example.

As illustrated in FIG. 4, each type of observation can be processed by a different generator and encoder pair trained based on the specific type of observation, whether it is satellite data, probe data, LiDAR data, or image data, for example. The observations, such as observations 402, can be received by encoder 400 which is a neural network that converts the observations into embeddings in the abstract space. For a concise space, these embeddings will be similar. While the encoder encodes data into the embedding space, multiple encoders exist for different data sets, such as encoder 410 for observations 412 and encoder 420 for observations 422. The embeddings produced by the different encoders are shown at 404, 414, and 424. The generator 406 (and generators 416, 426) generates required data for filtering, embedding update process and final map. The generator 406 processes the embeddings 404 to generated observations 408. Generators 416 and 426 process embeddings 414 and 424, respectively, to generate observations 418 and 428, respectively.

The embeddings 404, 414, and 424 are inputs to the contrastive loss 430, where the loss is established with the understanding that the embeddings are each based on observations of the same concise geographic area, indicating that they should correspond to some degree. The geographic area can be, for example, can be represented by an image of 256-pixels by 256-pixels, with each pixel representing a space of a half meter across. Contrastive losses are calculated at contrastive loss 430 from the embeddings for training. The losses are fed back to the encoders to improve the embeddings. By minimizing the contrastive loss, consistent embeddings are produced.

The example embodiment of the architecture of FIG. 4 initializes the map embeddings to initialize the system described herein. The generator of example embodiments is pre-trained to accurately generate human readable map information. The map generator can be deployed in the image domain with additional post processing steps described further below. Optionally, the map generator can generate geometries directly, such as using direct geometry generation from images with object detection, with graph estimation, or with a combination thereof.

FIG. 5 illustrates the architecture of an example embodiment of the map generator 312 of FIG. 3 as an extension of the architecture of FIG. 4. With embeddings normalized or made consistent as shown in the architecture of FIG. 4 based on the CLIP loss, the embeddings 440 are used as input to the map generator 312. The map generator produces a generated map 460 that is measured against the ground truth map 480 to obtain the loss 470. The map generator is thus trained on ground truth map objects directly, such as using object detection (e.g., YOLO) in the geometry/point space. To train the map generator 312, the ground truth map 480 is used to determine the loss 470 relative to the generated map 460, with the loss being fed back into the map generator.

According to embodiments described herein, not all types of observations will be present for a given area. For example, in a heavily treed area or an urban area, satellite imagery may not be available. The architecture of the embodiments described above can still be employed using fewer encoders to still obtain the embeddings. Based on contrastive learning, the observations can remain consistent across other sources.

Embodiments described herein can train all components (e.g., all encoders of different object types) together or train them independently. If trained independently, once the encoders and generators described above are trained, the encoders and generators can be implemented in the architecture depicted in the flow charts of FIGS. 3-5 where fine tuning training can occur. The contrastive loss 430 is trained first and then the map generator 312 is trained. Subsequently the system can be trained as a complete architecture to further refine the generated map 460 output.

As described above, the map generator can be employed in the image domain, with embeddings embedded in the image domain to formulate the problem as a vision problem that benefits from computer vision processes to improve functionality and efficiency. For example, converting probe data into histogram intensity images as observations, embodiments can employ, among other image processing models and algorithms, image deblurring techniques to restore the location data to a road segment or lanes of the road segment. Both the input observations and the output generated map could be in the format of images. By formatting the problem in the image domain, it is possible to employ image models to solve the problems addressed herein.

To construct the problem in the image domain, observations can take the form of images. In this manner, probe data is received from a plurality of probe devices within a geographic region. Probe devices can include, for example, mobile devices (e.g., cell phones), vehicles, wearable devices, or any device that can provide at least location and an associated time stamp. The probe data is generated in tabular form, with location information provided such as with latitude and longitude and the time stamp. Various other data can be provided in the probe data, such as heading, speed, altitude, trajectory identifiers, etc. However, the location and time are fundamental. From the tabular probe data, an image is generated through converging histogram counting. This rasterization of probe data generates an image from the probe data reflecting at least a location of probe data within an environment. The images can be in the form of tiles, with tiles representing a defined portion of the geographic region. According to an example embodiment, each pixel of a tile may represent an area of 0.5 meters by 0.5 meters. While the shape of a tile need not be square, and in many cases the tiles are not square due to curvature of the earth and respective latitude/longitude lines, tiles may be generally referred to as squares or approximate squares. The tile of an example embodiment is made up of 256 pixels along a first axis (e.g., latitude) and 256 pixels along a second axis (e.g., longitude). The value of a pixel in the tile reflects the probe count at that tile over a time window (e.g., over the past fifteen minutes when used for dynamic data such as traffic, or a matter of days when used for generating static map data such as road geometry).

The rasterization of probe data to form images can be images reflecting a period of time, as noted above, with shorter duration time windows reflecting dynamic probe data and longer periods of time better reflecting less dynamic or static probe data. The images created through the rasterization of probe data can be used in a variety of manners to generate map data and to repair map data geometries. Different image processing functions and algorithms can be applied to the images according to how the data is to be used, such as through use of deblurring, map data extraction, YOLO (you only look once) object detection, graph estimation, etc.

While the above described image is generated from probe data location and time, other channels can be employed to render the image more data rich and more useful for additional image processing purposes. Channels, which in an image can be represented by different colors, can be used to encode different elements of probe data. The different elements of the probe data, such as travel speed (e.g., average probe speed), can be encoded into a different colors. For example, in an image created with three color channels of Red, Blue, and Green, each color can represent a different component of the probe data. As an example, red can correspond to a speed of probes at a particular pixel corresponding to a particular location, blue can correspond to an average heading angle at the particular location, and green can correspond to lane marking observations from real sensor data (e.g., cameras or image sensors) at the particular location, with an intensity of the pixel hue corresponding to a probe data point count at the particular location.

The image channels of example embodiments can optionally be employed for encoding probe sequence information that can be used for generating linked lists of points. With object detection, such as YOLO, a line segment can be represented as a bounding box. Here, line segments can be represented as a string of connected line elements with a link list, where each node points to a next node. This information of the link list can be encoded using different channels of the image. For example, a first channel of the image (e.g., intensity) can reflect whether a pixel is a node in a node list (as a binary indicator), and can further indicate probe density at a particular pixel through a value that is non-binary. A second channel (e.g., red channel, blue channel, or green channel) can represent whether the node at the pixel has a subsequent node or a next-neighbor node. This is a binary representation of whether the pixel is a node, encoded in an available channel of the image. A third and fourth channel can be used to point to the next node (e.g., a coordinate pair). In this manner, the channels of the image encode the link list to reflect map objects within the image.

Different channels of an image can be used to combine data from different sources. One example embodiment includes an intensity of probes (e.g., count) in the first channel as above, the intensity of extracted real world observations from cameras in the second channel, and the gray-scaled satellite image at the pixel in the third channel. Other information that can be encoded into different channels of an image (and values for each pixel) include GNSS satellite count, precision/accuracy estimates for GNSS location, encoded probe trajectory information, turn probabilities, etc. To avoid saturation of the histogram, such as with areas of very high probe content, histogram normalization techniques can be applied to the images.

Depending upon a number of bits per pixel, the probe histogram count may require normalization. If only 8-bits are available, the maximum pixel value is limited to 255. Highways typically have much higher probe density than roads of a lower functional class (e.g., residential roads), and since images may contain both roads with high probe density and low probe density at the same time, it is important to preserve the dynamic range in the images. Without normalization, it may be necessary to clip the maximum pixel probe count (e.g., to 255 for 8-bit images), and this may yield a flat clipped probe histogram image for roads with high probe density. Some clipping may, however, be appropriate in cases where there are outlier spikes in the histogram, such as due to probe artifacts including stationary probe clusters (e.g., parking lots) or due to errors in probe data (e.g., in urban canyons).

To avoid clipping, embodiments can employ image equalization techniques that can map the histogram image into a fixed pixel range. Embodiments can further invert the image pixel intensity value (for better visualization) such that background (non-road) pixels are displayed in white. This enables use of datasets from roads in the same image with different levels of probe density (e.g., multiple road functional classes in the same image). The normalization techniques can be applied to the different channels independently on a per-channel basis as needed. The issue of saturation can be addressed by capturing probe data during varying time periods in dependence of a functional class of the road or by sampling at a higher/lower frequency selected based on the functional class of a road.

According to some embodiments, instead of having to compress high dynamic histograms to fit into a maximum pixel value by normalization or clipping, embodiments can employ variable sampling schemes. One such scheme is variable frequency, where roads of functional classes FC1 and FC2 such as highways with high traffic volumes are sampled less frequently than less driven residential roads, such as in functional classes FC4 and FC5. Optionally, the sampling time window may be varied based on how frequently certain roads are driven, such that FC1 and FC2 highways are sampled over a shorter time range compared to less driven roads such as FC4 and FC5 road that can be sampled over longer time windows. Road classification is not necessary to establish variable frequency data collection as the variable frequency can be established based on a volume of data (e.g., probes) from a particular road segment. Road segments with a large volume of data may be sampled less frequently, while road segments with a low volume of data may be sampled more frequently. This process ensures sufficient data is collected for a geographic area while mitigating issues with too much data. Notably, using non-uniform time windows may not be optimal for road geometry change detection.

According to an example embodiment, training label data for feature detection cases can be processed by rasterizing high definition road geometry. Features of the road geometry, such as width or length of the lines, can be adjusted to provide a target equivalent feature in raster form. Input images for training, validation/test, and label data, can be read directly from sources into multidimensional arrays (tensors) skipping intermediate file formats such as image file formats including conventional bitmaps, pngs, jpegs, etc.

Calculating probe statistics for each pixel can be computationally intensive as the underlying probe volume could be in the millions or potentially billions, particularly as probe devices proliferate. To be able to process the data in a timely manner is crucial to extract real-time information when processing dynamic map data. Aggregation of the relevant probe points is performed in an example embodiment by an aggregating query from a large in-memory database. The obtained aggregated probe data points are then forwarded to parallelized instances that perform the histogram-to-raster conversion for outputting images, either in image format or in multi-dimensional arrays/tensors corresponding to the target image size manageable by the image data model of choice. Using this process, data processing for an area of three kilometers by three kilometers can be performed efficiently, such as within seconds or minutes.

Creating rasterized probe data facilitates map healing and generation and can provide dynamic map data accurately and quickly while reducing processing requirements and capitalizing on image analysis models and algorithms. Using the images generated from probe data, embodiments can employ image processing models and algorithms as described above to extract map geometry from the images generated from probe data. Image deblurring is an example of such an algorithm. Image deblurring have been used to restore enhanced detail even when the blur pattern is unknown, such as in a blind deconvolution.

Road geometry and lane line geometry of example embodiments provided herein can be instrumental in establishing turn maneuvers at intersections. When incorrect lane line geometry exists, such as historical lane data that has been changed, lane line geometry cannot reliably be used by autonomous vehicles for autonomous control through the region of incorrect lane lines. In addition to road geometry including lane line geometry and point objects, other objects can be used for localization. POIs, building locations/facades, road signs, and other objects can be employed to understand location and to determine context of a vehicle traveling within a road network. While autonomous vehicles can employ sensor data collected on board the vehicle for control within an environment, the use of road geometry and lane line geometry enhances autonomous vehicle control and provides redundancy that improves efficiency, effectiveness, and safety of autonomous vehicle control. The efficient methods described herein rasterize probe data to generate images such that the problem of road geometries and lane line geometries can be solved through image processing techniques.

FIGS. 6 and 7 illustrate flowcharts depicting methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 6. The illustrated method may be performed, for example, by apparatus 200 using processor 202 with program code instructions stored in memory 204 to cause the apparatus to perform the operations of the method of FIG. 6. As shown at 510, apparatus is caused to receive first observation data associated with a geographic area. The first observation data is processed at 520 through a first encoder to produce first embeddings. At 530, second observation data is received associated with the geographic area. The second observation data is processed at 540 through a second encoder to produce second embeddings. A contrastive loss is established at 550 between the first embeddings and the second embeddings. Consistent embeddings are produced at 560 from the first embeddings and the second embeddings using the contrastive loss. At 570, map data reflecting the first observation data and the second observation data is generated from the consistent embeddings. A map database is updated at 580 with the map data. Operations 510-560 of the flowchart of FIG. 6 function to train the encoders, while operations 510-570 function to train the encoders and generators together. Operation 570 can optionally be implemented as a fine-tuning operation after 510-560 are complete, such that operation 570 is depicted with a broken line border as an optional operation.

While the flowchart of FIG. 6 depicts training of encoders and generators, FIG. 7 illustrates a flowchart for continuous running of the model. In continuous running, observations are not required from different sources simultaneously. As shown, observation data is received at 610 associated with a geographic area. Map data is generated at 620 from the stored embeddings for the corresponding area corresponding to the type of observations received in the observation data. At 630, the stored embeddings are updated to minimize the reconstruction loss calculated using generated observations and ground truth observations.

In an example embodiment, an apparatus for performing the methods of FIGS. 6 and 7 above may include a processor (e.g., the processor 202) configured to perform some or each of the operations (510-580 and/or 610-630) described above. The processor may, for example, be configured to perform the operations (510-580 and/or 610-630) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-580 and/or 610-630 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive first observation data associated with a geographic area, wherein the first observation data comprises sensor data from at least one sensor within the geographic area;
   process the first observation data through a first encoder to produce first embeddings;
   receive second observation data associated with the geographic area, wherein the second observation data comprises sensor data from at least one other sensor within the geographic area;
   process the second observation data through a second encoder to produce second embeddings;
   establish contrastive loss using a contrastive loss function between the first embeddings and the second embeddings;
   produce consistent embeddings from the first embeddings and the second embeddings using the contrastive loss;
   generate, from the consistent embeddings using a first map generator, map data reflecting the first observation data and the second observation data of point objects, and generate, from the consistent embeddings using a second map generator, map data reflecting the first observation data and the second observation data of line objects;
   measure the map data reflecting the first observation data and the second observation data produced from the consistent embeddings against ground truth map data using a loss function to obtain a reconstruction loss;
   train the first map generator and the second map generator using the reconstruction loss; and
   update a map database with the map data of both the point objects and the line objects.

2. The apparatus of claim 1, wherein causing the apparatus to generate, from the consistent embeddings, map data reflecting the first observation data and the second observation data comprises causing the apparatus to:

generate, from the consistent embeddings, map data reflecting the first observation data and the second observation data;
determine a loss of the map data relative to ground truth data; and
update a map generator generating the map data using the loss.

3. The apparatus of claim 1, wherein the first observation data associated with the geographic area comprises at least one of aerial image data, probe data, LiDAR (Light Distancing and Ranging) data, or vehicle image sensor data, wherein the second observation data associated with the geographic area comprises at least one of aerial image data, probe data, LiDAR data, or vehicle image sensor data different from the first observation data.

4. The apparatus of claim 3, wherein causing the apparatus to establish contrastive loss between the first embeddings and the second embeddings comprises causing the apparatus to establish contrastive loss between two different types of data from two different sources of data.

5. The apparatus of claim 1, wherein the first encoder is a neural network that transforms the first observation data into the first embeddings, and the second encoder is a neural network that transforms the second observation data into the second embeddings.

6. The apparatus of claim 1, wherein causing the apparatus to produce consistent embeddings from the first embeddings and the second embeddings using the contrastive loss comprises causing the apparatus to:
align the first embeddings with the second embeddings based on the contrastive loss; and
generate the consistent embeddings based on the first observation data of a first data type and the second observation data of a second data type, different from the first data type.

7. A method comprising:
receiving first observation data associated with a geographic area, wherein the first observation data comprises sensor data from at least one sensor within the geographic area;
processing the first observation data through a first encoder to produce first embeddings;
receiving second observation data associated with the geographic area, wherein the second observation data comprises sensor data from at least one other sensor within the geographic area;
processing the second observation data through a second encoder to produce second embeddings;
establishing contrastive loss using a contrastive loss function between the first embeddings and the second embeddings;
producing consistent embeddings from the first embeddings and the second embeddings using the contrastive loss;
generating, from the consistent embeddings using a first map generator, map data reflecting the first observation data and the second observation data of point objects, and generating, from the consistent embeddings using a second map generator, map data reflecting the first observation data and the second observation data of line objects;
measuring the map data reflecting the first observation data and the second observation data produced from the consistent embeddings against ground truth map data using a loss function to obtain a reconstruction loss;
training the first map generator and the second map generator using the reconstruction loss; and
updating a map database with the map data of both the point objects and the line objects.

8. The method of claim 7, wherein generating, from the consistent embeddings, map data reflecting the first observation data and the second observation data comprises:
generating, from the consistent embeddings, map data reflecting the first observation data and the second observation data;
determining a loss of the map data relative to ground truth data; and
updating a map generator generating the map data using the loss.

9. The method of claim 7, wherein the contrastive loss is determined using a contrastive language image pre-training (CLIP) loss function.

10. The method of claim 7, wherein the first observation data associated with the geographic area comprises at least one of aerial image data, probe data, LiDAR (Light Distancing and Ranging) data, or vehicle image sensor data, wherein the second observation data associated with the geographic area comprises at least one of aerial image data, probe data, LiDAR data, or vehicle image sensor data different from the first observation data.

11. The method of claim 10, wherein establishing contrastive loss between the first embeddings and the second embeddings comprises establishing contrastive loss between two different types of data from two different sources of data.

12. The method of claim 7, wherein the first encoder is a neural network that transforms the first observation data into the first embeddings, and the second encoder is a neural network that transforms the second observation data into the second embeddings.

13. The method of claim 7, wherein producing consistent embeddings from the first embeddings and the second embeddings using the contrastive loss comprises:
aligning the first embeddings with the second embeddings based on the contrastive loss; and
generating the consistent embeddings based on the first observation data of a first data type and the second observation data of a second data type, different from the first data type.

14. The method of claim 7, wherein the first observation data is received in at least near real-time and assembled into batches, wherein processing the first observation data through the first encoder to produce the first embeddings comprises processing a batch of the first observation data through the first encoder to produce the first embeddings.

15. A system for generation of map data comprising:
at least one memory comprising a map database stored therein; and
processing circuitry configured to:
receive first observation data associated with a geographic area, wherein the first observation data comprises sensor data from at least one sensor within the geographic area;
process the first observation data through a first encoder to produce first embeddings;
receive second observation data associated with the geographic area, wherein the second observation data comprises sensor data from at least one other sensor within the geographic area;
process the second observation data through a second encoder to produce second embeddings;
establish contrastive loss using a contrastive loss function between the first embeddings and the second embeddings;

produce consistent embeddings from the first embeddings and the second embeddings using the contrastive loss;
generate, from the consistent embeddings using a first map generator, map data reflecting the first observation data and the second observation data of point objects, and generate, from the consistent embeddings using a second map generator, map data reflecting the first observation data and the second observation data of line objects;
measure the map data reflecting the first observation data and the second observation data produced from the consistent embeddings against ground truth map data using a loss function to obtain a reconstruction loss;
train the first map generator and the second map generator using the reconstruction loss; and
update the map database with the map data of both the point objects and the line objects.

16. The system of claim 15, wherein the processing circuitry configured to generate, from the consistent embeddings, map data reflecting the first observation data and the second observation data comprises processing circuitry configured to:

generate, from the consistent embeddings, map data reflecting the first observation data and the second observation data;
determine a loss of the map data relative to ground truth data; and
update a map generator generating the map data using the loss.

17. The system of claim 15, wherein the contrastive loss is determined using a contrastive language image pre-training (CLIP) loss function.

18. The system of claim 15, wherein the first observation data associated with the geographic area comprises at least one of aerial image data, probe data, LiDAR data, or vehicle image sensor data, wherein the second observation data associated with the geographic area comprises at least one of aerial image data, probe data, LiDAR data, or vehicle image sensor data different from the first observation data.

19. The apparatus of claim 1, wherein causing the apparatus to generate, from the consistent embeddings, map data reflecting the first observation data and the second observation data comprises causing the apparatus to generate map data independently from the map database.

* * * * *